United States Patent Office 3,565,645
Patented Feb. 23, 1971

3,565,645
DENSIFIED ZIRCONIA-GLASS PRODUCT
Richard C. Anderson, Schenectady, N.Y., assignor to General Electric Company, a corporation of New York
No Drawing. Filed Oct. 30, 1967, Ser. No. 679,166
Int. Cl. C04b 35/48
U.S. Cl. 106—57
2 Claims

ABSTRACT OF THE DISCLOSURE

Improvement in the sintering temperature-time relationship for solid stabilized zirconia and maximizing of the resstance thereof to gas penetration is provided by the introduction of a small amount of a glass into the body of stabilized zirconia prior to sintering thereof. For those applications of stabilized zirconia, such as a high temperature electrolyte, wherein it is important that any treatment employed must not add to electronic conductivity or impair the high anionic conductivity thereof aluminate and silicate glasses are disclosed, which are suitable for sintering.

---

This improvement is broadly applicable to the sintering of zirconia ceramics, as for example may be used as a heat exhcanger medium, but has particular applicability in the preparation of solid stabilized zirconia electrolytes for fuel cells operable at temperatures in the range of over about 600° C. and up to about 1200° C. In addition to stabilized zirconia as the electrolyte such fuel cells employ solid electrodes (fuel and oxygen being supplied to the respective electrodes) and electrical leads connected to the respective electrodes. The exacting requirements for the electrolyte usage of sintered stabilized zirconia provide a severe test for the capabilities of this invention and for this reason the description herein has been directed in large part to the sintering of zirconia electrolytes.

These fuel cells, such as are shown in U.S. Letters Patent 3,138,487 and 3,138,490 assigned to the assignee of the instant application generate low voltage direct current power on continuous basis, have application in various chemical process industries, such as in the manufacture of aluminum and in the electro-refining of copper. In addition, the cells can be employed to operate direct current motors.

One of the problems faced in the use of solid oxide-ion electrolytes is that of the passage of gas through the electrolyte material. This action results in chemical shorting-out of the fuel cell as the gaseous fuel and oxidant burn in the pores of the electrolyte. By minimizing such gas penetration, the operating efficiency of the cell is increased. The addition of a small amount of iron oxide to stabilized zirconia prior to sintering so that iron oxide is present as a second phase during sintering of the zirconia is disclosed in application Ser. No. 412,158—Mitoff, filed Nov. 18, 1964 and assigned to the assignee of this invention. This modified solid stabilized zirconia sinters at a much reduced temperature and after sintering permits minimal gas passage therethrough and performs as an essentially ionic conductor.

It is the prime object of this invention to modify stabilized zirconia by the addition of glass liquid phase sintering agent thereby to provide for a significant reduction in the temperature-time requirements for the sintering thereof.

A further object of this invention is the provision of glass liquid phase sintering agents able to substantially reduce the temperature-time sintering requirements of stabilized zirconia without materially adding to the level of electronic conductivity or materially impairing the level of oxide-ion conductivity of the zirconia.

These and other objects, features and advantages of this invention will be better understood from the following description, wherein a small amount of a glass is introduced into and remains present in a layer or body of stabilized zirconia as a separate phase, the layer or body of zirconia being heated for a period of several hours in an atmosphere inert to zirocnia (or to a coated zirconia body being sintered) to effect sintering thereof at some temperature in the range of about 1300–1400° C. in less than about 10 hours of sintering time.

Stabilized zirconium oxide, a well-known solid oxygen-ion electrolyte for high temperature fuel cells, can be made acceptably impermeable (impervious to gases) by firing a pressed, cast, or sprayed compact thereof at a temperature and for a time between about 1800° C. for about 24 hours and 1900° C. for about 3 hours without the use of additives. The particular temperature-time relationship suitable will depend upon the stabilizing agent, size of $ZrO_2$ particles and the particular fabrication process. However, it is always economically desirable to be able to produce this sintered condition by firing to temperatures significantly lower than 1800° C. and to fire for shorter periods. There is an additional advantage to be gained in those cases in which the stabilized zirconia has been preformed as a composite with a metal electrode, which may for example cover one major surface thereof. It may be impossible to fire such composites in the 1800°–1900° C. range without destroying the composite itself.

Solid stabilized zirconia is a compound with a cubic crystal structure consisting of zirconia to which is added calcium oxide, magnesium oxide, yttrium oxide, ytterbium oxide, scandium oxide, rare earth oxides, or mixtures of these oxides. For example, one preferred solid zirconia material is stabilized with 11 molecular percent calcium oxide. Other stabilized zirconias, which may also be employed in the solid stabilized zirconia electrolyte, are discussed in "Oxide Ceramics" by Ryshkewitch, Academic Press, 1960, particularly on pages 354, 364 and 376 thereof.

Zirconia may be purchased commercially already stabilized or in a relatively pure state for stabilization (conversion from monoclinic zirconia to cubic zirconia) by the user. Typical analyses of the pre-stabilized and unstabilized zirconias used in the production of this invention are set forth below:

Pre-stabilized:

| | |
|---|---:|
| $ZrO_2$ * | 93.94 |
| $SiO_2$ | 0.62 |
| $Fe_2O_3$ | 0.10 |
| $TiO_2$ | 0.11 |
| CaO | 4.80 |
| MgO | 0.25 |
| $Al_2O_3$ | 0.18 |
| Total | 100.00 |

Unstabilized:

| | |
|---|---:|
| $ZrO_2$ * | 99.08 |
| $SiO_2$ | 0.18 |
| CaO | 0.22 |
| MgO | 0.15 |
| $Fe_2O_3$ | 0.10 |
| $Al_2O_3$ | 0.16 |
| $TiO_2$ | 0.11 |
| Total | 100.00 |

*Traces of $HfO_2$.

By way of example, a composite tube was prepared consisting of a porous nickel inner tube with an outer stabilized, but otherwise unmodified, zirconia layer plasma-sprayed thereover, these parts being intended to function as fuel cell anode and electrolyte, respectively. The composite tube was fired at 1400° C. in a hydrogen atmosphere (just below the melting point of nickel) for 10 hours. Upon being tested the composite tube was found to have a gas permeability ranging from about $1 \times 10^{-3}$ to $1 \times 10^{-4}$ standard cc. of air/minute/cm. of mercury (pressure)/cm.$^2$ (area)/cm. (thickness). This porosity is considered excessive for the proposed use, the maximum permissible permeability being less than $1 \times 10^{-4}$ cc./minute/cm. Hg/cm.$^2$/cm.

However, it has been discovered that a substantially impervious body of solid stabilized zirconia can be made by sintering (at a temperature not exceeding about 1400° C. for heating periods of less than about 10 hours) a composition consisting of stabilized zirconia and a small amount (from about 0.5–5.0 weight percent) of glass. Such a composition may be prepared, for example, by simultaneous deposit using plasma spray techniques. Using the aforementioned technique, particles of the stabilized zirconia and particles of the specific glass used either can be fed into the same plasma via separate feed channels or can be pre-mixed and introduced into the plasma for the melting and forced discharge thereof.

Thus, a finely ground glass powder (e.g., −325 mesh) may be blended with particles of stabilized zirconia (preferably −325 mesh). The resultant mixture may be formed by dry pressing, extrusion or other conventional ceramic forming procedures or, as has been stated hereinabove, may be deposited by plasma spraying. Impregnation of a preformed solid porous body of zirconia with very fine (about 1 micron) particles of the glass phase may be effected by infiltration from a liquid-solid suspension or may even be accomplished electrophoretically. Any of these methods adding the glass during formation will insure a homogeneous distribution of the liquid-forming glass phase throughout the stabilized zirconia body.

Having produced the stabilized zirconia-glass composite, this ceramic form is then fired to some temperature higher than the temperature at which the liquid glass phase begins to form (i.e., the solidus temperature). When these conditions prevail the ceramic body undergoes an enhanced sintering, because of the presence of the liquid phase sintering agent (the glass). As a result, the open (connecting) porosity of the body is virtually eliminated and the permeability thereof is greatly reduced.

Selection of the glass additive depends upon the use to which the sintered stabilized zirconia body is to be subjected. Thus, if the stabilized zirconia shape is only expected to possess significant structural integrity, the glass employed need only have a suitable low liquid forming temperature in order that it will be present as a second phase and in the liquid state at the sintering temperature to function as the sintering aid (liquid phase sintering).

If, on the contrary, the sintered stabilized zirconia layer, or body, is to be used as a solid electrolyte, consideration must be given both to preservation of the high anionic conductivity of the zirconia and to avoidance of the introduction of electronic conductivity into the body. It has been discovered that these stringent conditions can be met with either an aluminate glass or a silicate glass having the compositions (expressed in weight percent) set forth below:

| Component | Aluminate glass | Silicate glass |
|---|---|---|
| Calcium oxide (CaO) | 35–60 | 5–55 |
| Alumina (Al$_2$O$_3$) | 30–60 | 5–45 |
| Silica (SiO$_2$) | 0–10 | 30–75 |

Useful variations of the above compositions may be prepared by substituting barium oxide (BaO) or strontium oxide (SrO) for the CaO in whole or in part or by substituting MgO for CaO to a limit of 10 percent. To substitute BaO, SrO or MgO in any given composition of glass it is necessary simply to express the amount of each component of the given composition containing CaO in mole percent and then to substitute for the CaO on an equivalent mole percent basis. The amount of glass required to lower the sintering temperature may range from about 0.5 to about 5.0 weight percent. The smaller quantities of glass can be successfully employed by increasing sintering time up to about 10 hours.

The sintered stabilized zirconia resulting from the practice of this invention may contain slightly more glass than the amount added, because of the possibility of glass formation from impurities in the starting material (i.e. CaO pre-stabilized zirconia). However, this end product may be characterized as containing sufficient glass (either as a glassy phase or as a crystallized derivative thereof) to insure a maximum permeability of less than about $1 \times 10^{-4}$ cc./min./cm. Hg/cm.$^2$/cm. and the glass content being greater than about 1.0 weight percent and up to about 5 weight percent.

EXAMPLE 1

Identically deposited ceramic tubes (2) were prepared using pre-stabilized zirconia (−325 mesh) deposited by plasma-spray techniques on aluminum mandrels. The mandrels were later removed by chemical digestion and the remaining ceramic tubes were fired in hydrogen at 1400° C. for 3 hours. One tube was unmodified while the other tube contained 1% alumina glass (−325 mesh) having the composition:

| | Weight percent |
|---|---|
| CaO | 41.5 |
| MgO | 6.7 |
| Al$_2$O$_3$ | 51.8 |
| Total | 100.0 |

This glass, a eutectic composition melting at 1345° C., was mixed with the zirconia before spraying. Upon measuring the permeabilities of these tubes it was found that the permeability was significantly reduced by the presence of the liquid phase sintering agent. Tests of the ceramic tubes showed that the tube without the glass sintering agent has a permeability of $3 \times 10^{-4}$ cc./minute/cm. Hg/cm.$_2$/cm. after sintering, while the tube with the 1% glass had a permeability of $7 \times 10^{-5}$ cc./minute/cm. Hg/cm.$^2$/cm.

EXAMPLE 2

Identically deposited ceramic tubes (3) were prepared by plasma-spraying on aluminum mandrels. The zirconia was unstabilized material to which Y$_2$O$_3$ had been added (85 wt. percent ZrO$_2$ and 15 wt. percent Y$_2$O$_3$) as the stabilizing agent. The mandrels were later removed by chemical digestion. Two tubes were unmodified, while the last tube containied (premixed with the zirconia before spraying) 2 wt. percent of the same alumina glass (−325 mesh) composition as was used in Example 1. The ceramic tubes without the glass sintering agent were fired in hydrogen, the first at 1900° C. for 3 hours and the second at 1400° C. for 1 hour. The ceramic tube with the glass addition was fired in hydrogen at 1400° C. for 3 hours. The results are shown in Table I.

TABLE I

| Tube | Added glass | Firing temp., ° C. | Firing time (hrs.) | Permeability (cc./min./cm. Hg/cm.$^2$/cm.) |
|---|---|---|---|---|
| 1 | 0 | 1,900 | 3 | $6 \times 10^{-4}$ |
| 2 | 0 | 1,400 | 1 | $2 \times 10^{-3}$ |
| 3, weight percent | 2 | 1,400 | 3 | $8 \times 10^{-5}$ |

EXAMPLE 3

Ceramic tubes were prepared using Y$_2$O$_3$-stabilized zirconia as in Example 2, but containing varying percentages of a silica glass composition (CaO 21 wt. percent, Al$_2$O$_3$ 13 wt. percent, SiO$_2$ 66 wt. percent). This glass is close to a eutectic composition, which melts at 1170° C. As in all previous examples, the particles of zirconia and glass were of −325 mesh size and were pre-mixed before being plasma sprayed. All ceramic tubes were prepared by plasma spray deposition on either copper or aluminum mandrels, the mandrels being removed by chemical digestion. As in the previous examples firing was in a hydrogen atmosphere. Results of permeability tests are shown in Table II and may be compared to the results for tubes 1 and 2 of Table I.

TABLE II

| Added glass (wt. percent) | Firing temp., (° C.) | Firing time (hrs.) | Permeability (cc./min./cm. Hg/cm.²/cm.) |
|---|---|---|---|
| 1 | 1,400 | 1 | 5×10⁻⁴ |
| 2 | 1,400 | 3 | ¹ <5×10⁻⁵ |
| 4 | 1,400 | 3 | 2×10⁻⁵ |
| 1–4 | 1,400 | 10 | 2×10⁻⁶ to 5×10⁻⁵ |

¹ Limit of measurement capability.

Stabilized zirconias to which aluminate glasses are added as sintering aids require longer sintering periods (at the same sintering temperatures and for the same amount of glass additive) than the same zirconia to which silicate glasses are added. Also, from the above examples it may be concluded that additions of about 2 weight percent glass to zirconia provide superior sintering action than the addition of either more or less glass and, therefore is a preferred amount for addition. Even small amounts of glass sintering agent result in a very significant improvement in the sintering of zircinia.

It appears that such glas as may be added remains as a separate material dispersed in the zirconia matrix and does not dissolve therein or lose its identity.

In addition to the economic gain made possible by being able to sinter stabilized zirconia at a considerably lower temperature than the unmodified zirconia, this invention provides particular benefit for those instances in the preparation of composite bodies in which the stabilized zirconia layer to be sintered contains, or is in contact with a layer which contains, a metal such as nickel. If sintering has to be conducted above about 1450° C. the nickel would melt and the composite construction would be destroyed.

What I claim as new and desire to secure by Letters Patent of the United States is:

1. In a sintered body of zirconia made dense by the addition of a quantity of glass thereto forming a two-phase system, the improvement wherein the zirconia is a stabilized zirconia and the glass forms a second phase dispersed therethrough in the quantity of from about 0.5 to 5 weight percent and is selected from the group consisting of:

(a) an aluminate glass having the following composition expressed in weight percent:

Alumina _____ 30–60
Silica _____ 0–10
Material selected from the group consisting of
    of CaO, BaO, SrO and mixtures thereof __ 35–60 and (b) a silicate glass having the following composition expressed in weight percent:

Alumina _____ 5–45
Silica _____ 30–75
Material selected from the group consisting of
    CaO, BaO, SrO and mixtures thereof ____ 5–55 whereby the oxygen ion conductivity of the stabilized zirconia is not impaired.

2. In a sintered body of zirconia made dense by the addition of a quantity of glass thereto forming a two-phase system the improvement wherein the zirconia is a stabilized zirconia and the glass forms a second phase dispersed therethrough in the quantity of from about 0.5 to 5 weight percent and is selected from the group consisting of:

(a) an aluminate glass having the following composition expressed in weight percent:

Calcium oxide _____ 35–60
Magnesium oxide _____ 0–10
Alumina _____ 30–60
Silica _____ 0–10 and (b) a silicate glass having the following composition expressed in weight percent:

Calcium oxide _____ 5–55
Magnesium oxide _____ 0–10
Alumina _____ 5–45
Silica _____ 30–75 whereby the oxygen ion conductivity of the stabilized zirconia is not impaired.

References Cited

UNITED STATES PATENTS

| | | | |
|---|---|---|---|
| 2,306,349 | 12/1942 | Wainer | 106—57 |
| 2,567,592 | 9/1951 | Ballard | 106—57 |
| 3,190,769 | 6/1965 | Vasilos | 106—57 |
| 3,301,646 | 1/1967 | Smoo | 106—57 |
| 3,350,230 | 10/1967 | Tannenberger et al. | 106—57 |

JAMES E. POER, Primary Examiner

U.S. Cl. X.R.

136—153